(12) United States Patent
Miura

(10) Patent No.: US 7,199,998 B2
(45) Date of Patent: Apr. 3, 2007

(54) ELECTRONIC DEVICE WITH ANGLE-ADJUSTABLE PANEL

(75) Inventor: Shinsuke Miura, Kawasaki (JP)

(73) Assignee: NEC Corporation, Kanagawa (JP)

( * ) Notice: Subject to any disclaimer, the term of this patent is extended or adjusted under 35 U.S.C. 154(b) by 268 days.

(21) Appl. No.: 11/010,442

(22) Filed: Dec. 14, 2004

(65) Prior Publication Data

US 2005/0128688 A1 Jun. 16, 2005

(30) Foreign Application Priority Data

Dec. 15, 2003 (JP) .............................. 2003-416532

(51) Int. Cl.
*H05K 5/00* (2006.01)
(52) U.S. Cl. ...................................... 361/679; 361/686
(58) Field of Classification Search ........ 361/679–683, 361/686
See application file for complete search history.

(56) References Cited

U.S. PATENT DOCUMENTS 6,353,529 B1 * 3/2002 Cies ........................... 361/681

2004/0164965 A1 * 8/2004 Bullister ........................ 345/168

FOREIGN PATENT DOCUMENTS

JP H07-104886 A 4/1995

* cited by examiner

*Primary Examiner*—Yean-Hsi Chang
(74) *Attorney, Agent, or Firm*—Sughrue Mion, PLLC

(57) ABSTRACT

A panel, rotatably attached to a body of a telephone set, is provided with a rib having the first and second convex parts. A slide member, slidably held by a panel receiving portion of the body, is provided with a leaf spring which is in contact with a rib supporting portion and the panel receiving portion. When the panel rotates from the panel receiving portion to a position at a desired angle, the first or second convex part of the rib pushes the rib supporting portion, and the slide member then slides relative to the panel receiving portion while causing elastic deformation of the leaf spring. Once the first or second convex part of the rib passes through the rib supporting portion, the slide member is returned to an original position by the leaf spring, and the rib supporting portion supports the rib. Once the slide member slides, the panel rotates from the position at the desired angle to the panel receiving portion, and the slide member is returned to the original position by the leaf spring.

6 Claims, 11 Drawing Sheets

ELECTRONIC DEVICE WITH ANGLE-ADJUSTABLE PANEL

BACKGROUND OF THE INVENTION

1. Field of the Invention

The present invention relates to angle adjustment of a panel in an electronic device such as a telephone set, a terminal device and the like.

2. Description of the Related Art

A terminal device with an angle-adjustable display, described in the Japanese Patent Laid-Open Publication No. Heisei 7-104886, is described as a conventional technology with reference to FIGS. 1 to 3D.

FIG. 1 is a side view of the terminal device, FIG. 2 is an exploded perspective view of the terminal device, and FIGS. 3A to 3D are enlarged side views depicting various statuses of a variable-angle securing mechanism of the terminal device.

A display 32 such as a liquid crystal display (LCD) is rotatably attached to a body 31 of the terminal device by a hinge mechanism 33. The display 32 is secured by the variable-angle securing mechanism 34 at a predetermined angle.

The variable-angle securing mechanism 34 has a fixed locking member 41 provided inside the body 31 and a movable locking member 42 provided to the display 32. The fixed locking member 41 is fixed to the body 31 by inserting a securing pin 43 into a through hole located in a lower portion of the fixed locking member 41. The fixed locking member 41 has a curved convex-concave portion 41a formed on the outer edge thereof on the right hand side. The movable locking member 42 has a hook portion 42a protruding from the lower portion thereof on the left hand side and having a shape which fits into the concave parts of the convex-concave portion 41a. The movable locking member 42 has a through hole 42b in the middle as well as a pin 42c protruding above the through hole 42b.

The variable-angle securing mechanism 34 is provided with an attachment member 43 extending downward from an upper inner part of the body 31. The attachment member 43 has a through hole 43a in the middle. A securing pin 44 is inserted into this through hole 43a as well as the through hole 42b of the movable locking member 42, and a through hole 32b of a triangle section 32a extending from an end of the display 32 towards the body 31. The movable locking member 42 rotates about the securing pin 44. A torsion coil spring 45 is attached to the securing pin 44, and the coiled portion of the torsion coil spring 45 is fit onto the securing pin 44. The torsion coil spring 45 is provided with angular C-shaped sections 45a and 45b at the ends of elastic members, respectively. These elastic members extend from the coiled portion in opposite directions. The angular C-shaped section 45a is engaged with the end of the attachment section 43, whereas the angular C-shaped section 45b is engaged with the lower portion of the movable locking member. The hook portion 42a of the movable locking member 42 is thus always pressed by the torsion coil spring 45 towards the fixed locking member 42. In other words, the hook portion 42a of the movable locking member 42 is biased so that the hook portion 42a fits into the concave parts of the convex-concave portion 41a of the fixed locking member 41. Moreover, a truck-shaped through hole 32c is provided in the upper portion of the triangle section 32a of the display 32, and the pin 42c of the movable locking member 42 is movably inserted into this through hole 32c. The pin 42c protrudes from the side of the display 32, so an operator can move the pin 42c using his/her finger within the through hole 32c in the arrow n direction in FIG. 1.

FIG. 3A shows a status where the movable locking member 42 of the variable-angle securing mechanism 34 is locked to the fixed locking member 41. FIG. 3B shows a status where the movable locking member 42 is unlocked from the fixed locking member 41. FIG. 3C shows a status where the display 32 is pulled up after the unlocking of the movable locking member 42 from the fixed locking member 41. FIG. 3D shows a status where the movable locking member 42 is locked to the fixed locking member 41 while the display 32 is pulled up.

In the status shown in FIG. 3A, the hook portion 42a of the movable locking member 42 is biased by the torsion coil spring 45 in the arrow r direction and fits into a concave part of the convex-concave portion 41a of the fixed locking member 41. Therefore, when input operations are performed on the touch panel on the surface of the display 32, the display 32 does not move so easily.

Next, a method of adjusting an angle of the display 32 to a desired angle is described. An operator hooks his/her finger on the pin 42c and moves the pin 42c in the arrow n direction within the through hole 32c as in FIG. 3A. The hook portion 42a thus moves in the arrow m direction while resisting the torsion coil spring 45. Therefore, the hook portion 42a is unlocked and released from the concave part of the convex-concave portion 41a as shown in FIG. 3B. While the hook portion 42a is released, the operator pulls up the display 32 as shown in FIG. 3C.

Thereafter, the operator removes his/her finger from the pin 42c when the pulled-up display 32 comes to a position at a desired angle as shown in FIG. 3D. Since the hook portion 42a is pressed by the torsion coil spring 45 in the arrow r direction, the hook portion 42a fits into a concave part of the convex-concave portion 41a and stops there. Consequently, the movable locking member 42 is locked to the fixed locking member 41 at a position where the pulled-up display 32 is tilted at a desired angle.

The above-described conventional terminal device with an angle-adjustable display requires two steps in the angle adjustment operation for the display; to move the pin 42c using an operator's finger, and to rotate the display 32. This angle-adjustment operation is troublesome, and the structure of the variable-angle securing mechanism is complicated.

SUMMARY OF THE INVENTION

An object of the present invention is to provide an electronic device in which an angle of a panel thereof can be adjusted by an easy operation and with a simple structure.

This object is achieved by an electronic device with an angle-adjustable panel, which comprises a body of the electronic device, a panel rotatably attached to the body, a panel receiving portion provided in the body, and a slide member slidably held by the panel receiving portion, wherein:

the panel is provided with a rib having a convex part;

the slide member is provided with a rib supporting portion enabled to support the rib and a leaf spring which is in contact with the panel receiving portion;

when the panel rotates from the panel receiving portion to a position at a desired angle, the convex part of the rib pushes the rib supporting portion of the slide member, whereby the slide member slides relative to the panel receiving portion while causing elastic deformation of the leaf spring;

once the convex part passes through the rib supporting portion, the slide member is returned to an original position by the leaf spring and the rib supporting portion supports the rib;

once the slide member slides, the panel rotates from the position at the desired angle to the panel receiving portion, and the slide member is returned to the original position by the leaf spring.

DESCRIPTION OF THE PREFERRED EMBODIMENT

A telephone set with an angle-adjustable panel of an embodiment of the present invention is described.

Prior to the description of the embodiment of the present invention, a method of adjusting an angle of the panel of the telephone set is described in order to promote understanding.

Figure 1:
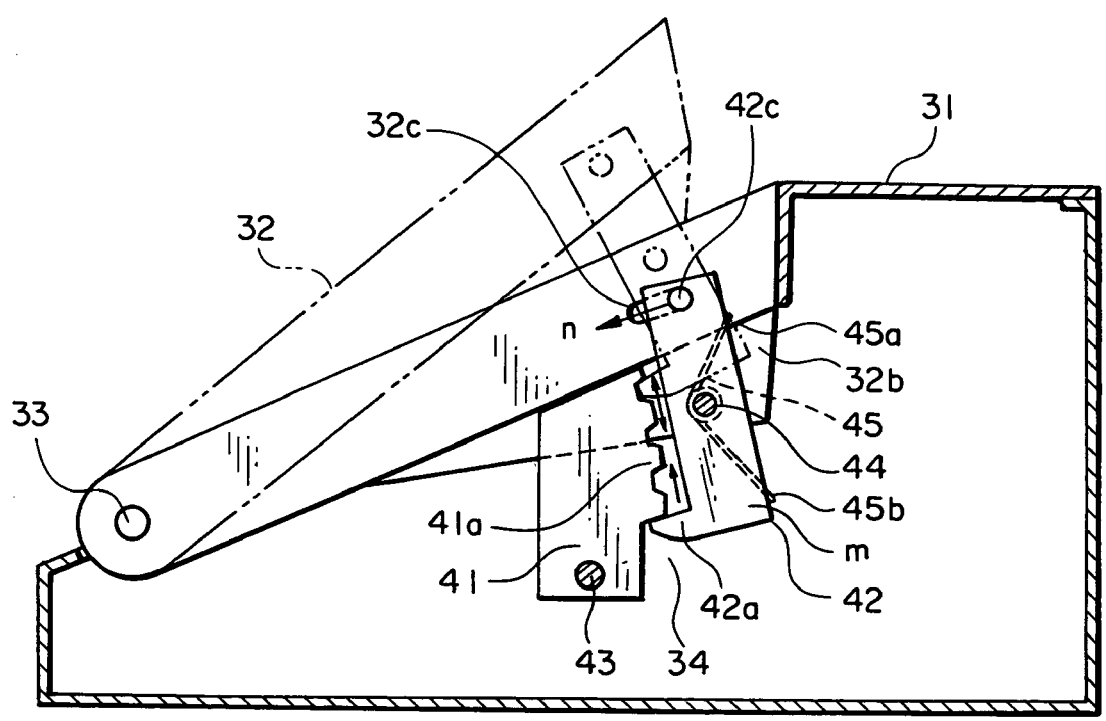
FIG. 1 is a cross-sectional side view of a conventional terminal device with an angle-adjustable display.
Figure 2:
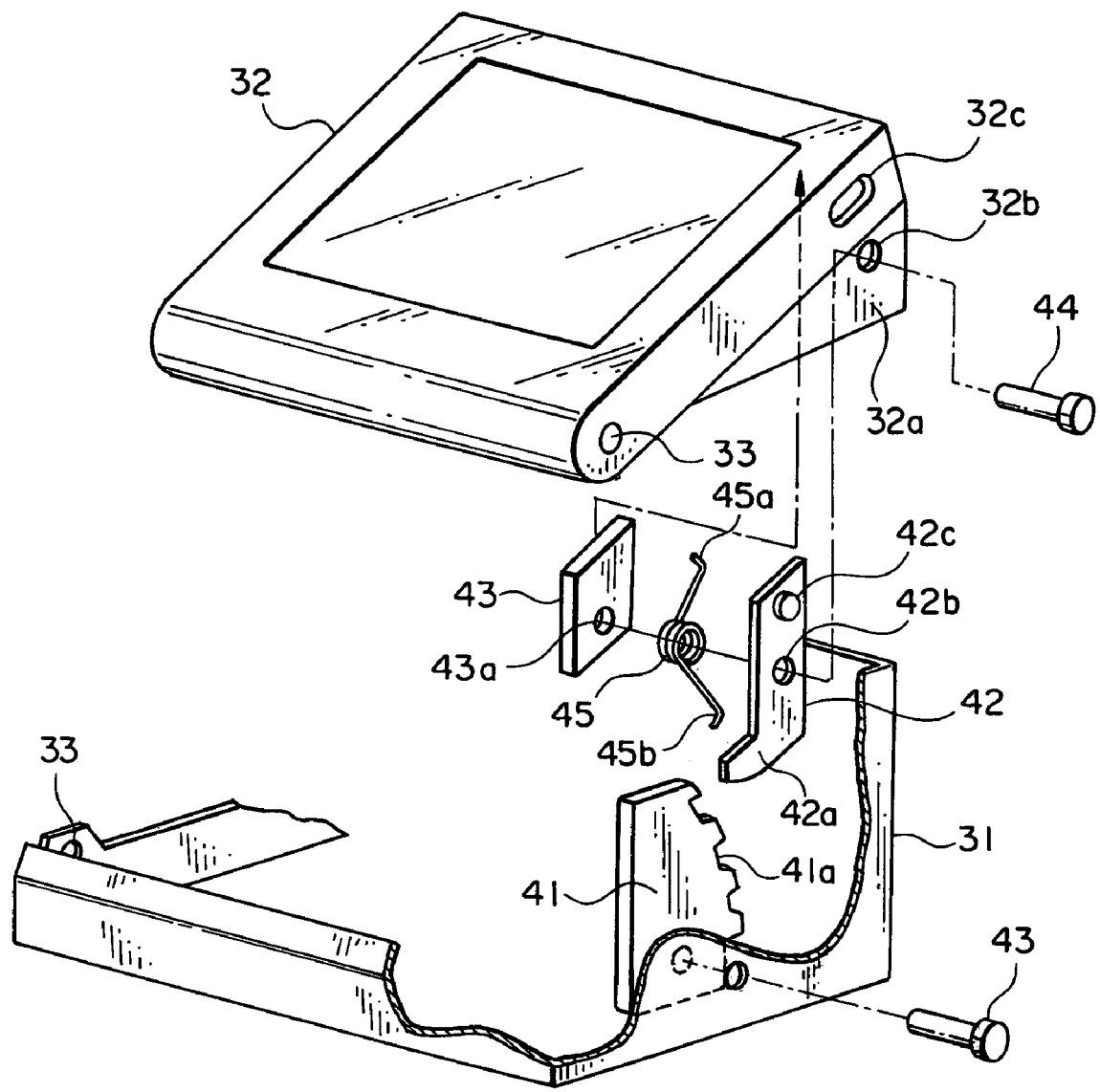
FIG. 2 is an exploded perspective view of the terminal device.
Figure 3A:
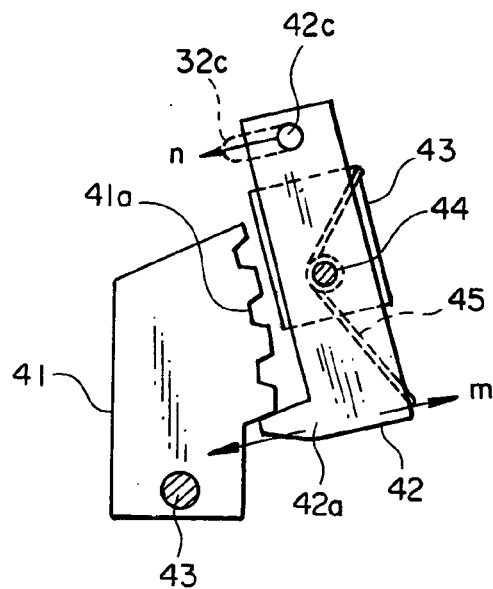
FIG. 3A is an enlarged side view of the first process of angle adjustment by a variable-angle securing mechanism of the terminal device.
Figure 3B:
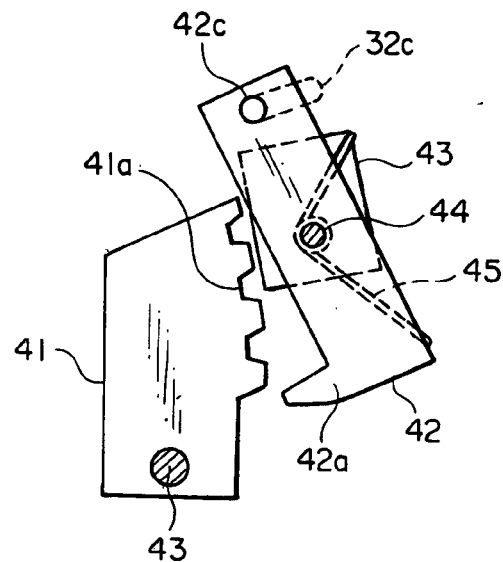
FIG. 3B is an enlarged side view of the second process of angle adjustment by the variable-angle securing mechanism of the terminal device.
Figure 3C:
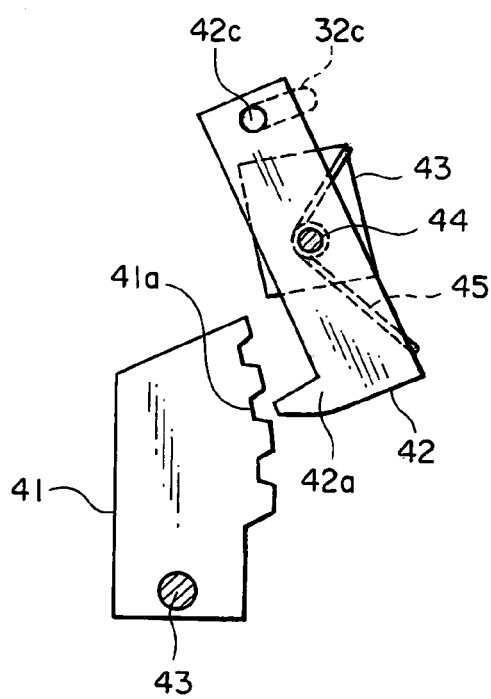
FIG. 3C is an enlarged side view of the third process of angle adjustment by the variable-angle securing mechanism of the terminal device.
Figure 3D:
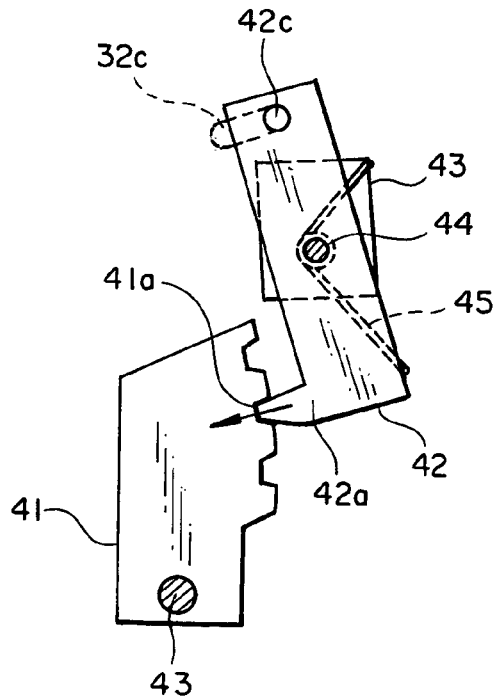
FIG. 3D is an enlarged side view of the fourth process of angle adjustment by the variable-angle securing mechanism of the terminal device.
Figure 4A:
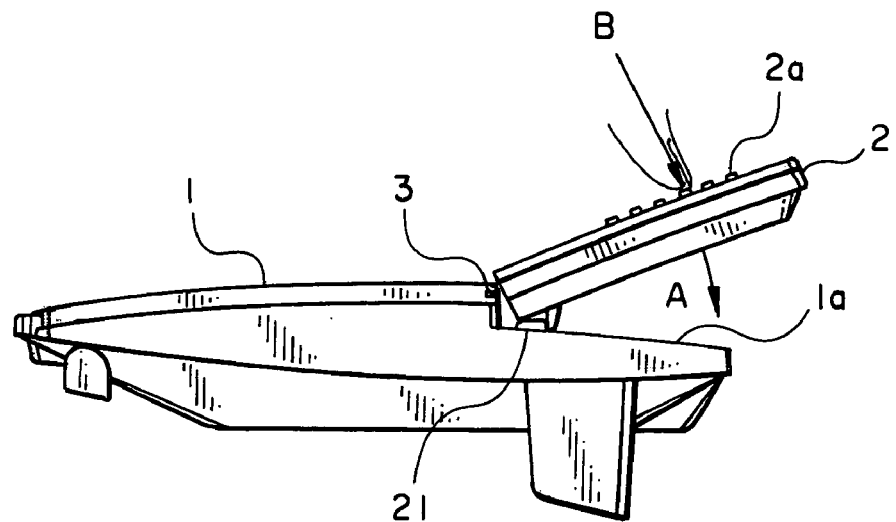
FIG. 4A is an explanatory side view showing the first angle adjustment method for a panel of a telephone set in order to promote understanding of the present invention.

First of all, the first method of angle adjustment is described with reference to FIG. 4A. To a synthetic-resin-made body 1 of the telephone set, a panel 2, also made of synthetic resin, is rotatably attached by a rotational shaft 3. Many operation keys 2a are provided on an operation section on the surface of the panel 2.

In order to make it convenient for an operator to use the telephone set, the panel 2 is tilted relative to the body 1. Thereafter, a spacer 21, made of silicone rubber, is inserted between the panel 2 and a panel receiving portion 1a of the body 1, located under the rotational shaft 3. Thereby, the panel 2 is maintained in a tilted state at a desired angle relative to the body 1.

However, when the telephone set receives any vibration and impact, the spacer 21 may be removed from the position between the panel 2 and the panel receiving portion 1a under the rotational shaft 3. In such a case, the panel 2 falls down in the arrow A direction centering around the rotational shaft 3. Moreover, when an operator presses each operation key 2a by his/her finger in the arrow B direction, the panel 2 also falls down due to pressing force applied to the panel 2.

Figure 4B:
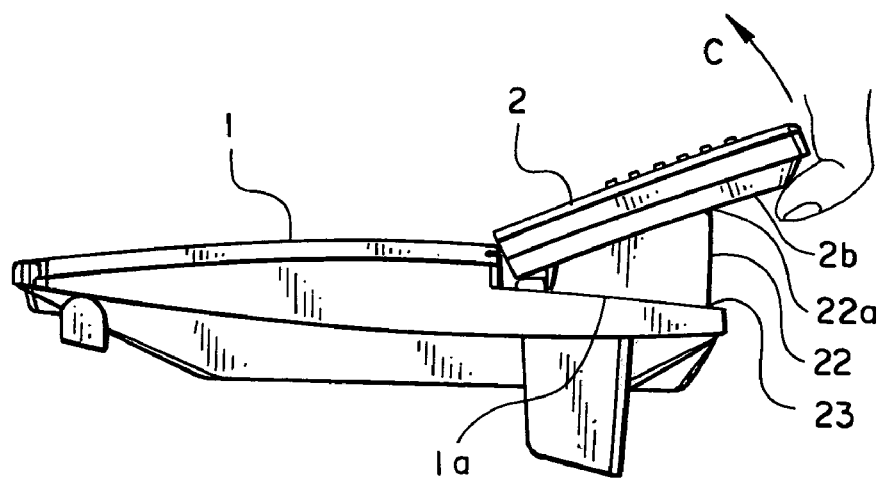
FIG. 4B is an explanatory side view showing the second angle adjustment method for the panel of the telephone set in order to promote understanding of the present invention.

Next, the second method of angle adjustment is described with reference to FIG. 4B. The first action by an operator is to catch the end of the panel 2 using his/her finger and pull up the panel 2 in the arrow C direction. The second action is to vertically bring up a support bar 22 being rotatably attached to the panel receiving portion 1a of the body 1, centering around the rotational shaft 23. The support bar 22 thus supports a bottom surface 2b of the panel 2 with its end 22a. This method of angle adjustment requires two actions, and the adjustment operation is thus complicated.

Now, the embodiment of the present invention, which is an improved version of each of the said first and second methods of angle adjustment, is described with reference to FIGS. 5 to 11C.

Figure 5:
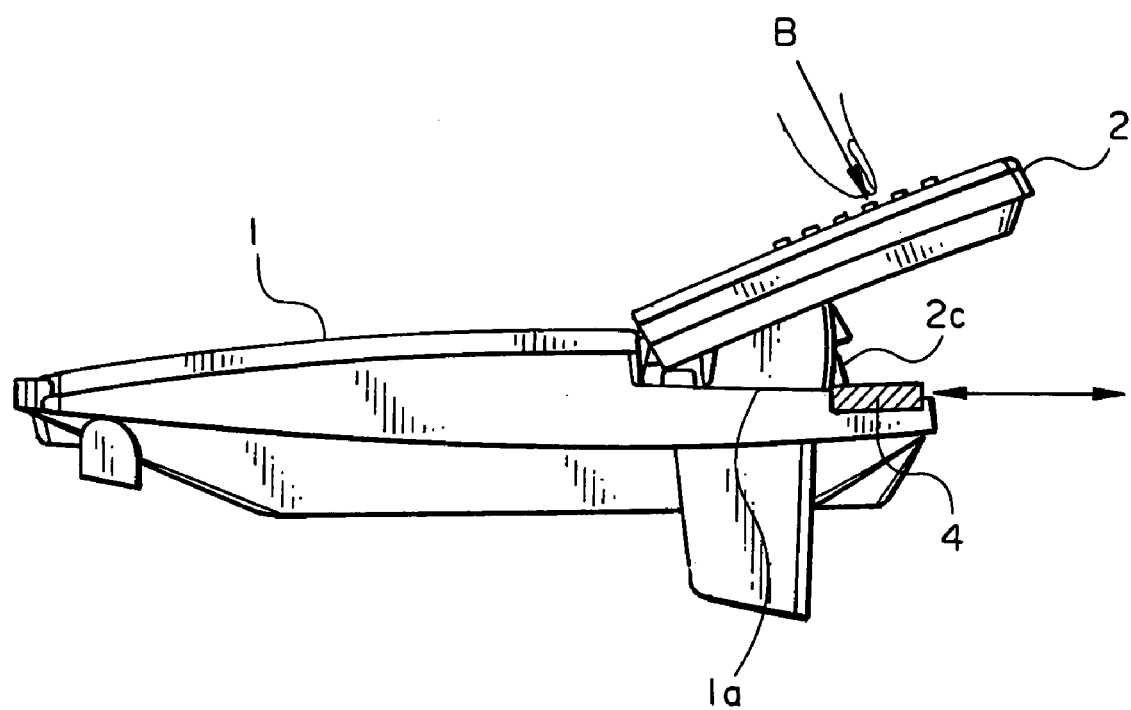
FIG. 5 is a side view of a telephone set with an angle-adjustable panel according to an embodiment of the present invention.

FIG. 5 is a side view of a telephone set. (An essential part is shown in cross section). Four ribs 2c for supporting the panel as well as two guide-and-protection portions 2d (see FIGS. 6A to 6F), formed on both sides of the ribs 2C, respectively, are integrally formed on the bottom surface of the panel 2. Moreover, a slide member 4, which supports each rib 2c, is attached to the panel receiving portion 1a of the body 1. Each rib 2c and the slide member 4 are detailed below.

Figure 6E:
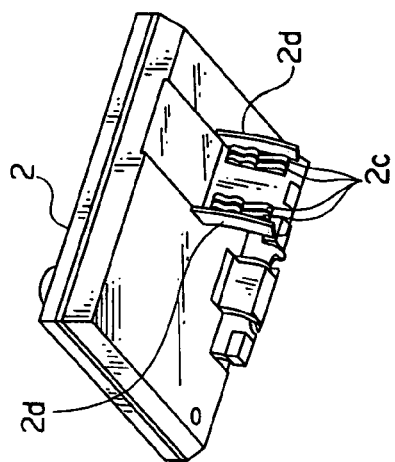
FIG. 6E is an anterior perspective view of the backside of the telephone set.
Figure 6F:
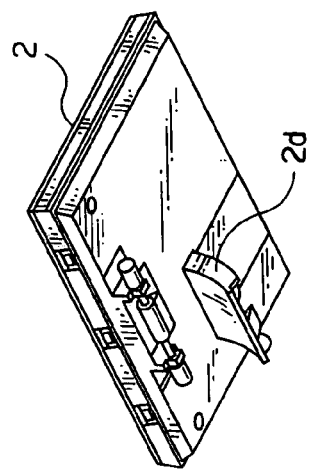
FIG. 6F is a posterior perspective view of the backside of the telephone set.
Figure 6B:
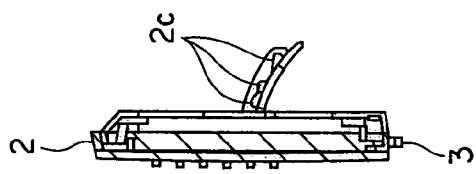
FIG. 6B is a side view of the telephone set.
Figure 6D:
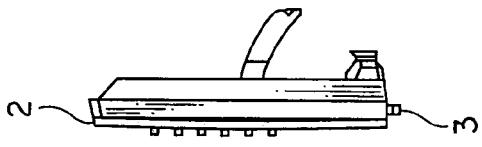
FIG. 6D is a cross-sectional view of the telephone set taken along the line a—a in FIG. 6A.
Figure 6A:
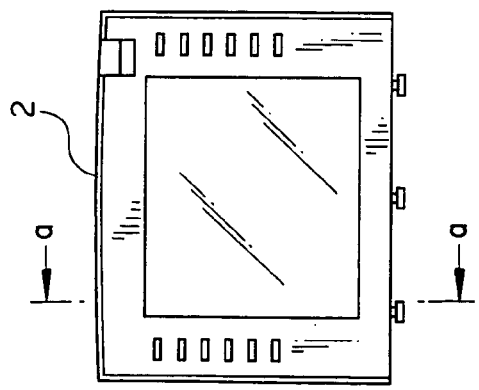
FIG. 6A is a front view of the telephone set.
Figure 6C:
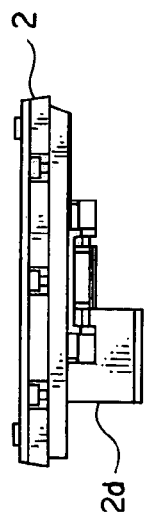
FIG. 6C is a rear view of the telephone set.
Figure 7B:
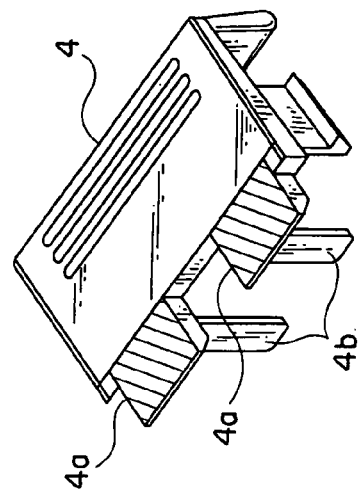
FIG. 7B is an anterior perspective view of the front side of the slide member of the telephone set.
Figure 7E:
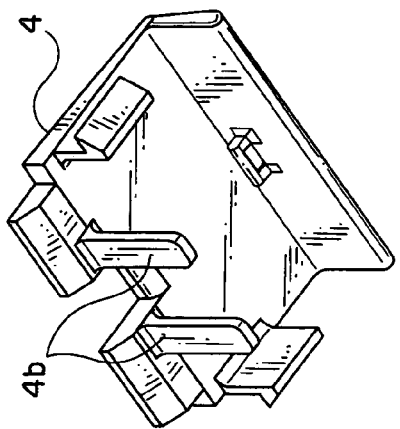
FIG. 7E is an anterior perspective view of the backside of the slide member of the telephone set.
Figure 7D:
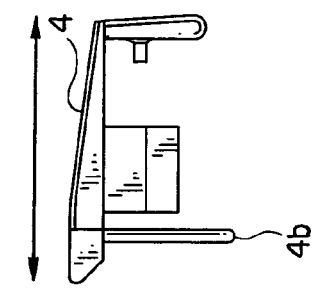
FIG. 7D is a side and partially cross-sectional view of the slide member of the telephone set.
Figure 7A:
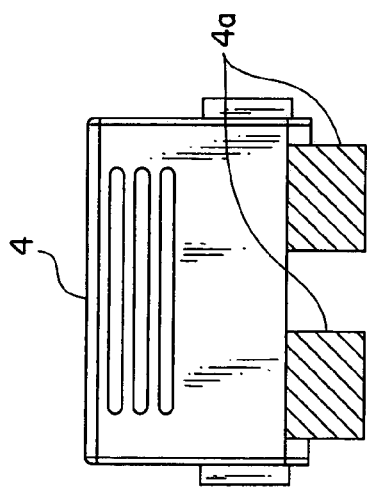
FIG. 7A is a front view of a slide member of the telephone set.
Figure 7C:
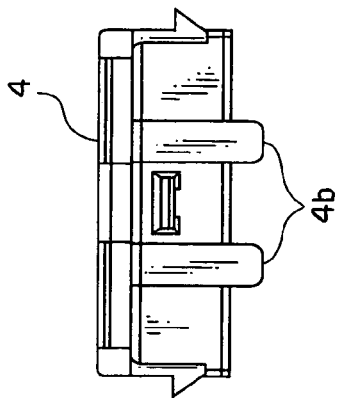
FIG. 7C is an anterior view of the slide member of the telephone set.

FIGS. 6A to 6F show various views of the panel 2. As shown in FIG. 6E, two sets of two ribs 2c (four ribs in total) for supporting the panel 2 and the guide-and-protection portions 2d located on both sides of the four ribs 2c are integrally formed on the bottom surface of the panel 2.

FIGS. 7A to 7E (three times larger than FIGS. 6A to 6F) show various views of the slide member 4 for supporting each rib 2c. The slide member 4 is made of metal and provided with rib supporting portions 4a for supporting the ribs 2c, respectively on the two places on the top surface thereof so that leaf springs 4b may protrude below each rib supporting portion 4a.

Figure 8:
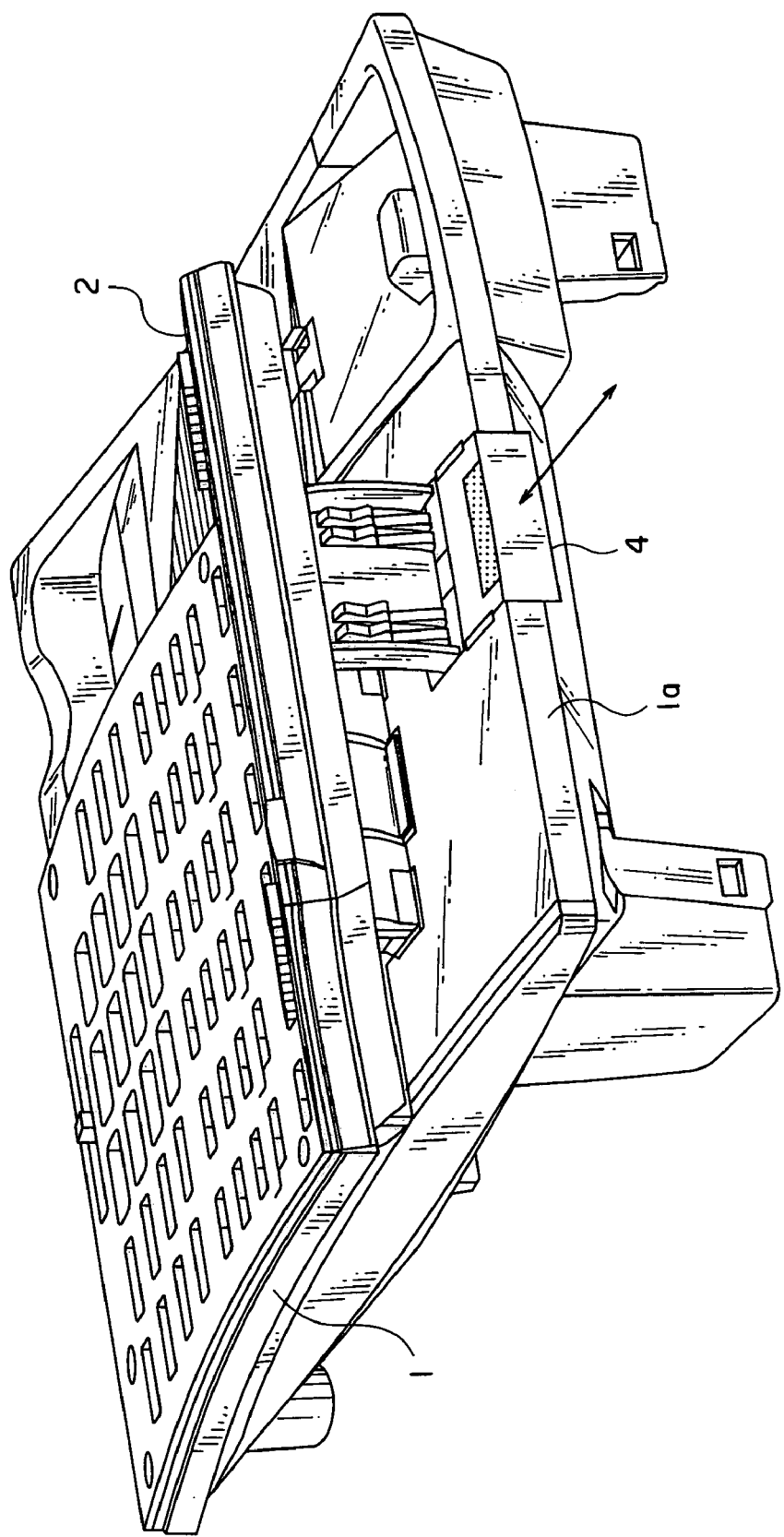
FIG. 8 is a posterior perspective view of the telephone set.

FIG. 8 is a posterior perspective view of the telephone set. The panel 2 has been pulled up so that an angle of the panel 2 is adjusted to an angle of two steps. The slide member 4 is attached to the body 1 so that it slides in the arrow directions relative to the panel receiving portion 1a of the body 1 (see FIGS. 10A to 10C and FIGS. 11A to 11C for further details).

Figure 9B:
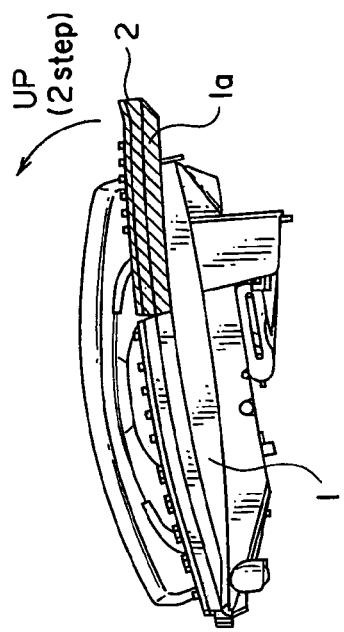
FIG. 9B is a side and partially cross-sectional view of the telephone set when the panel is positioned approximately horizontally.
Figure 9D:
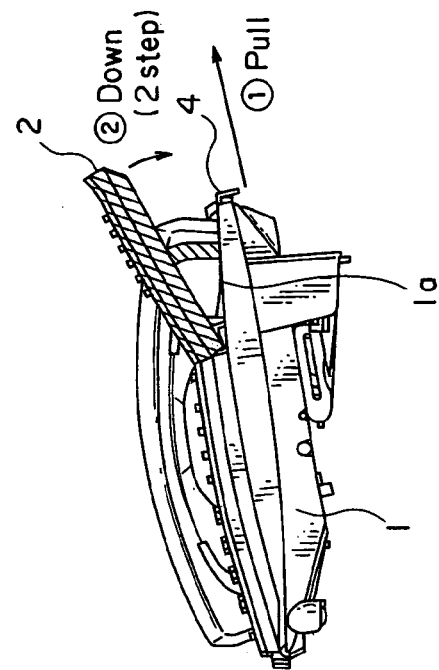
FIG. 9D is a side and partially cross-sectional view of the telephone set when the angle of the panel has been adjusted to the angle of two steps.
Figure 9A:
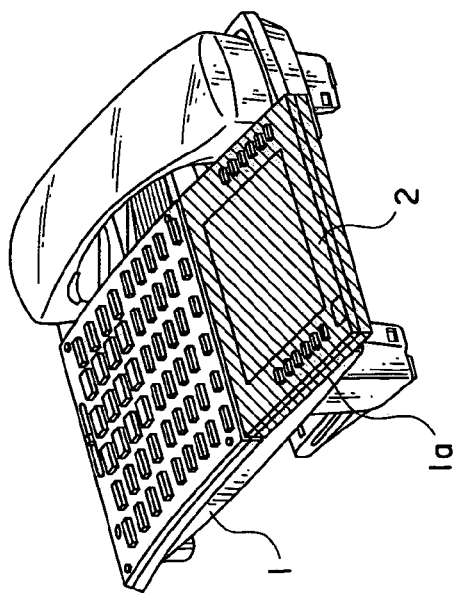
FIG. 9A is a posterior perspective view of the telephone set when the panel is positioned approximately horizontally.
Figure 9C:
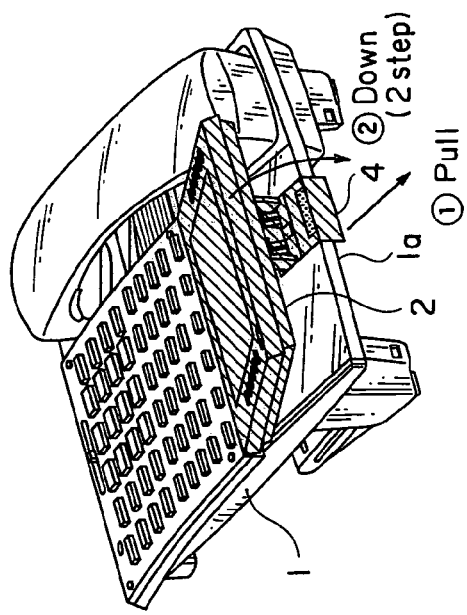
FIG. 9C is a posterior perspective view of the telephone set when an angle of the panel has been adjusted to an angle of two steps.

FIGS. 9A to 9D are various views schematically depicting ascent (Up) and descent (Down) of the panel 2 of the telephone set. In a state shown in FIG. 9a where the panel 2 is positioned directly on the panel receiving portion 1a of the body 1 (approximately in the horizontal state), an operator catches the end of the panel 2 with his/her finger and turns the panel 2 in the arrow direction for two steps as shown in FIG. 9B. Then, the panel 2 comes into a state shown in FIG. 9C. In this event, the slide member 4 is pushed out of the panel receiving portion 1a and then returns to the original position. The rotation of the panel 2 and sliding of the slide member 4 will be described later. Once the slide member 4 is pulled from the panel receiving portion 1a by the operator's finger in the arrow direction in the state shown in FIGS. 9C and 9D, the panel 2 rotates in the "Down" arrow direction and then comes into the state shown in FIGS. 9A and 9B. Once the slide member 4 is released from the operator's finger, the slide member 4 returns to the original position.

The rotation of the panel 2 and sliding of the slide member 4 are detailed with reference to FIGS. 10A to 10C and FIGS. 11A to 11C.

Figure 10A:
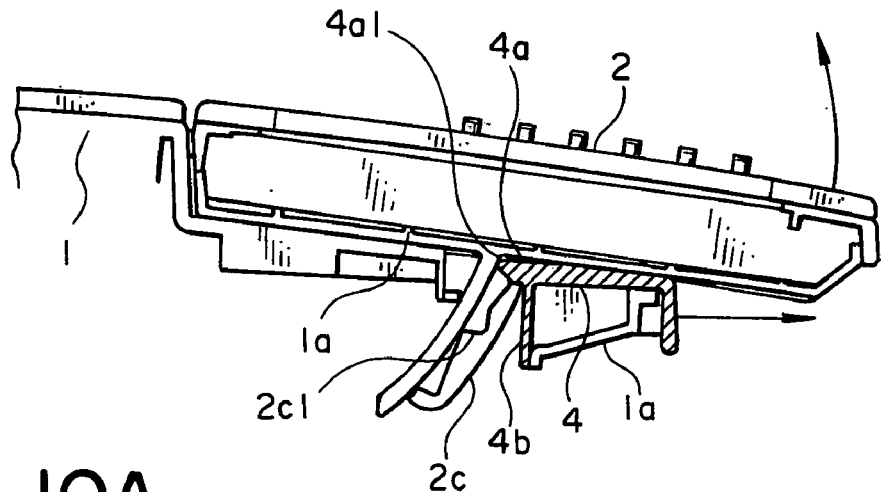
FIG. 10A is a side and partially cross-sectional view showing a relationship between a rib of the panel of the telephone set and the slide member of the same when the panel is positioned approximately horizontally.
Figure 10B:
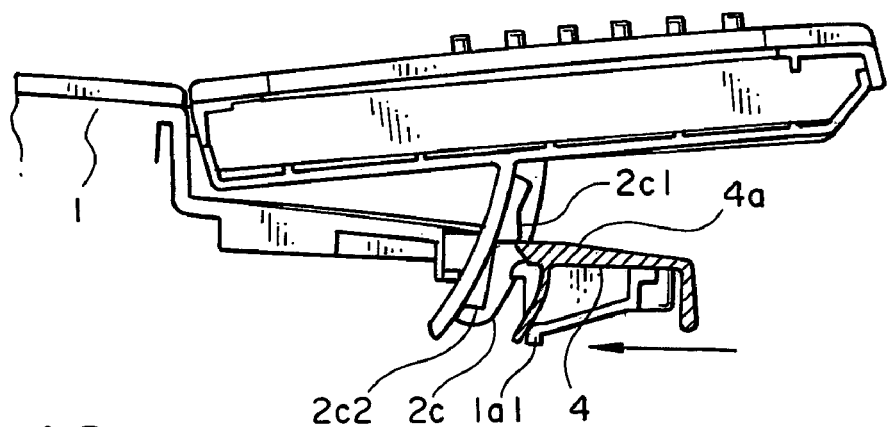
FIG. 10B is a side and partially cross-sectional view showing a relationship between the rib of the panel of the telephone set and the slide member of the same when the angle of the panel has been adjusted to an angle of one step.
Figure 11A:
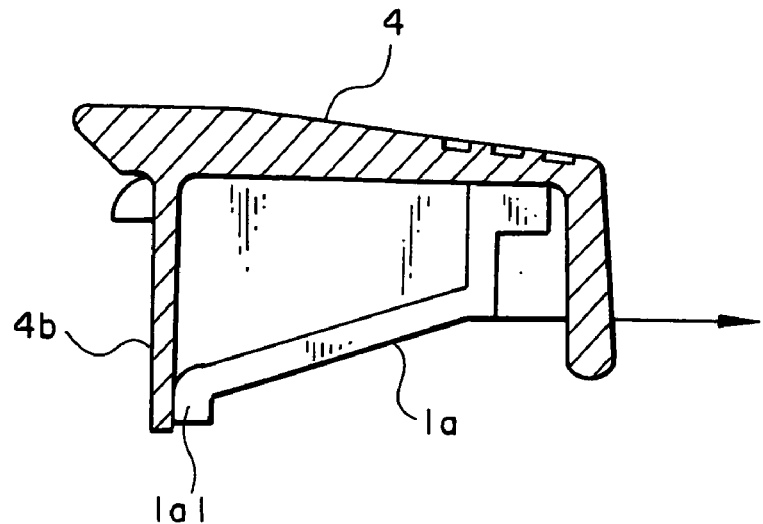
FIG. 11A is a side and partially cross-sectional view showing a relationship between the slide member of the telephone set and a panel receiving portion in the body of the same when the slide member is not pushed by the panel.
Figure 11B:
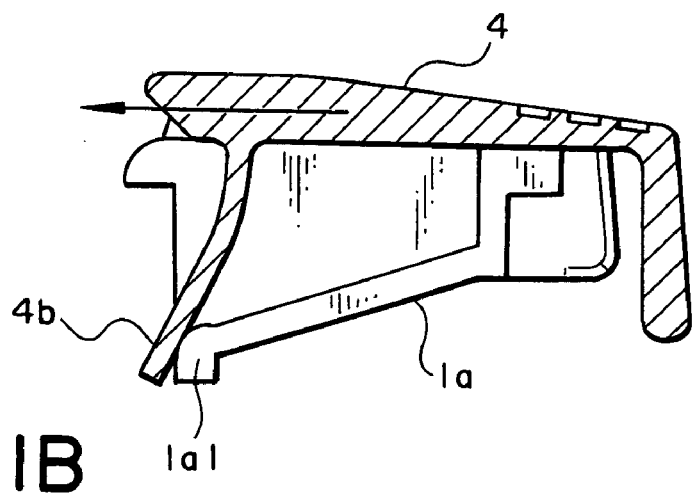
FIG. 11B is a side and partially cross-sectional view showing a relationship between the slide member of the telephone set and the panel receiving portion in the body of the same when the slide member is pushed by the rib of the panel in the direction opposite to the arrow.

If an operator catches the end of the panel 2 with his/her finger and pulls up the panel 2 in the arrow direction for one step (at a small angle) in the state where the panel 2 is positioned directly on the panel receiving portion 1a of the body 1 (approximately in the horizontal state) as shown in FIG. 10A (see FIG. 11A), the panel 2 thus comes into a state shown in FIG. 10B (see FIG. 11B). In this event, a first convex part 2c1 of each rib 2c pushes an end 4a1 of each rib supporting portion 4a of the slide member 4. Therefore, the slide member 4 slides in the direction of another arrow in FIG. 10A (see FIG. 11A), and each leaf spring 4b of the slide member 4 comes into contact with a lower end 1a1 of the panel receiving portion 1a and is elastically deformed as shown in FIG. 10B (see FIG. 11B). Thereafter, once the first convex part 2c1 of each rib 2c ascends and moves away from each end 4a1 of the slide member 4, the slide member 4 returns to the original position by restoration force of each leaf spring 4b of the slide member 4 (see FIG. 11C). However, since the first convex part 2c1 of each rib 2c of the panel 2 sits atop each rib supporting portion 4a of the slide member 4, the position of the slide member 4 slightly shifts downward relative to the panel receiving portion 1a. The each rib supporting portion 4a of the slide member 4 supports each rib 2c of the panel 2 in this manner.

Figure 10C:
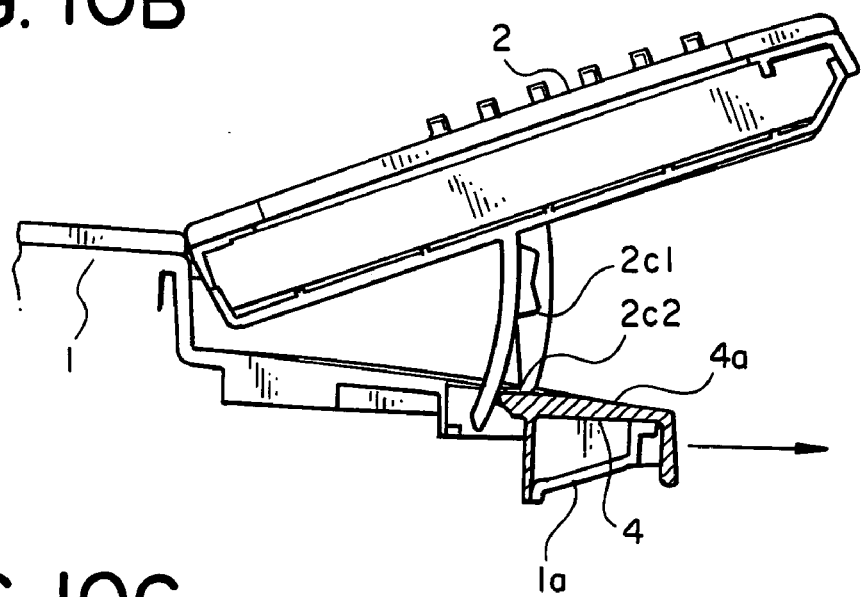
FIG. 10C is a side and partially cross-sectional view showing a relationship between the rib of the panel of the telephone set and the slide member of the same when the angle of the panel has been adjusted to the angle of two steps.
Figure 11C:
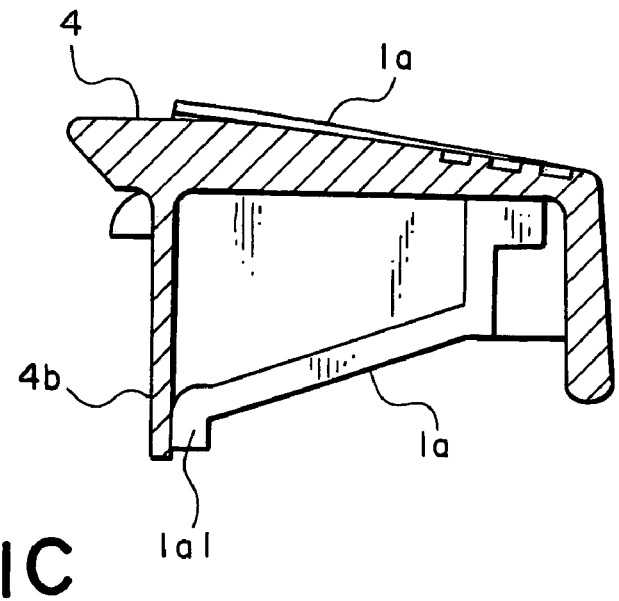
FIG. 11C is a side and partially cross-sectional view showing a relationship between the slide member of the telephone set and the panel receiving portion in the body of the same when the slide member is supporting the rib of the panel.

Once the operator catches the end of the panel 2 with his/her finger and pulls up the panel 2 further for another step (at a large angle) in the state shown in FIG. 10B, the panel 2 comes into a state shown in FIG. 10C (see FIG. 11C). In this event, a second convex part 2c2 of each rib 2c pushes the end 4a1 of each rib supporting portion 4a of the slide member 4. Therefore, the slide member 4 slides in the direction opposite to the arrow in FIG. 10B (see FIG. 11A), and each leaf spring 4b of the slide member 4 comes into contact with the lower end 1a1 of the panel receiving portion 1a and is elastically deformed as shown in FIG. 10B (see FIG. 11B). Thereafter, once the second convex part 2c2 of each rib 2c ascends and moves away from each end 4a1 of the slide member 4, the slide member 4 returns to the original position by restoration force of each leaf spring 4b (see FIG. 11C). However, since the second convex part 2c2 of each rib 2c of the panel 2 sits atop each rib supporting portion 4a of the slide member 4, the position of the slide member 4 slightly shifts downward relative to the panel receiving portion 1a. Each rib supporting portion 4a of the slide member 4 supports each rib 2 of the panel 2 in this manner.

When changing the state shown in FIG. 10C to the state where the panel 2 lies directly on the panel receiving portion 1a of the body 1 (approximately in the horizontal state), the operator pulls the slide member 4 with his/her finger in the arrow direction. The panel 2 then rotates clockwise upon the rotational shaft 3 until the panel 2 comes into contact with the panel receiving portion 1a and stops. Thereafter, once the slide member 4 is released from the operator's finger, the slide member 4 returns to the original position due to restoration force of each leaf spring 4b.

In this embodiment, since the first and second convex parts 2c1 and 2c2 are formed in each rib 2c, an angle of the panel 2 of the telephone set is adjusted to three different angles. Further a third convex part and the like may be formed so that the angle of the panel 2 of the telephone set can be adjusted to four or more different angles.

In FIG. 6E, the number of ribs 2c is four pieces in total, two pieces each on the right and left, respectively. However, modification can be made so that there are two ribs 2c, one on the right and the other on the left. It is also possible to make modification so that there is one rib 2c in total. In such a case, two rib supporting portions 4a are to be modified into one portion.

The leaf springs 4b are provided on the two spots in the slide member 4. However, modification can be made so that the leaf springs 4b can be provided on one spot.

As obvious from this specification, the present invention produces the following effects.

1. When increasing a tilt angle of the panel, only one operation, pulling up the panel, is required. Thus, the angle adjustment operation is simple.

2. The electronic device is configured by the body, panel, panel receiving portion, and slide member. This structure is simple, tough and compact, with a small number of parts. Assembly and disassembly are thus easy, and, in addition, cost is low.

What is claimed is:

1. An electronic device with an angle-adjustable panel, comprising:
   a body of the electronic device;
   a panel rotatably attached to the body;
   a panel receiving portion provided in the body; and
   a slide member slidably held by the panel receiving portion, wherein
   the panel is provided with a rib having a convex part,
   the slide member is provided with a rib supporting portion enabled to support the rib and a leaf spring which is in contact with the panel receiving portion,
   when the panel rotates from the panel receiving portion to a position at a desired angle, the convex part of the rib pushes the rib supporting portion of the slide member, whereby the slide member slides relative to the panel receiving portion while causing elastic deformation of the leaf spring, and, once the convex part passes through the rib supporting portion, the slide member is returned to an original position by the leaf spring and the rib supporting portion supports the rib, and once the slide member slides, the panel rotates from the position at the desired angle to the panel receiving portion, and the slide member is returned to the original position by the leaf spring.

2. An electronic device with an angle-adjustable panel according to claim 1, wherein the rib has the plurality of convex parts, and the panel can rotate from the position at the desired angle to a position at another desired angle.

3. An electronic device with an angle-adjustable panel according to claim 1, wherein the panel has the plurality of ribs, and the slide member has the plurality of rib supporting members.

4. An electronic device with an angle-adjustable panel according to claim 1, wherein the slide member has the plurality of leaf springs.

5. An electronic device with an angle-adjustable panel according to claim 1, wherein an end of the leaf spring comes into contact with a lower end of the panel receiving portion.

6. An electronic device with an angle-adjustable panel according to claim 1, wherein guide-and-protection portions are provided on both sides of the rib, respectively, the guide-and-protection portions being integrally formed in the panel.

* * * * *